United States Patent
Sprague

(10) Patent No.: US 8,223,803 B2
(45) Date of Patent: Jul. 17, 2012

(54) PROGRAMMABLE TIME DIVISION MULTIPLEXED SWITCHING

(75) Inventor: Edward E. Sprague, Woodside, CA (US)

(73) Assignee: Infinera Corporation, Sunnyvale, CA (US)

( * ) Notice: Subject to any disclaimer, the term of this patent is extended or adjusted under 35 U.S.C. 154(b) by 70 days.

(21) Appl. No.: 12/344,124

(22) Filed: Dec. 24, 2008

(65) Prior Publication Data

US 2009/0245289 A1    Oct. 1, 2009

Related U.S. Application Data

(60) Provisional application No. 61/027,013, filed on Feb. 7, 2008.

(51) Int. Cl.
*H04J 3/00* (2006.01)
(52) U.S. Cl. .......................... 370/498; 375/259; 375/260
(58) Field of Classification Search .................. 370/280, 370/294, 315, 316, 319, 321, 329, 330, 345, 370/347, 431, 442, 464, 478, 498; 375/259–260
See application file for complete search history.

(56) References Cited

U.S. PATENT DOCUMENTS

| | | | |
|---|---|---|---|
| 6,842,422 B1 | 1/2005 | Bianchini, Jr. | |
| 6,906,999 B1 | 6/2005 | Schulz | |
| 6,941,252 B2 | 9/2005 | Nelson et al. | |
| 6,985,956 B2 | 1/2006 | Luke et al. | |
| 7,103,041 B1 | 9/2006 | Speiser et al. | |
| 7,242,686 B1 * | 7/2007 | Dougherty et al. | 370/395.4 |
| 7,274,696 B1 | 9/2007 | Sikdar | |
| 7,283,547 B1 | 10/2007 | Hook et al. | |
| 7,535,893 B1 * | 5/2009 | Beladakere et al. | 370/353 |

* cited by examiner

*Primary Examiner* — Hassan Kizou
*Assistant Examiner* — Charles C Jiang
(74) *Attorney, Agent, or Firm* — Harrity & Harrity LLP; David L. Soltz

(57) ABSTRACT

A network device may include a set of switches. Each of the switches may include a set of ingress links and a set of egress links. One of the switches may store mapping information that identifies a first timeslot and one of the egress links for data received, during a second timeslot, on one of the ingress links. The one of the switches may receive data, associated with the second timeslot, on the one of the ingress links, identify the first timeslot and the one of the egress links, associated with the second timeslot and the one of the ingress links, based on the mapping information, and output the data, during the first timeslot, on the one of the egress links.

24 Claims, 11 Drawing Sheets

PROGRAMMABLE TIME DIVISION MULTIPLEXED SWITCHING

RELATED APPLICATION

This application claims priority to U.S. Provisional Patent Application No. 61/027,013, filed Feb. 7, 2008, the disclosure of which is incorporated by reference herein in its entirety.

BACKGROUND

Time-Division Multiplexing (TDM) is a type of digital multiplexing in which two or more signals or bit streams are transferred simultaneously as sub-channels in one communication channel, but are physically taking turns on the channel. The time domain is divided into several recurrent timeslots of fixed length, one for each sub-channel. After the last sub-channel, the cycle starts all over again.

TDM is commonly used for circuit mode communication with a fixed number of channels and constant bandwidth per channel. Time-division multiplexing differs from statistical multiplexing, such as packet switching, in that that the timeslots are recurrent in a fixed order and pre-allocated to the channels, rather than scheduled on a packet-by-packet basis.

SUMMARY

According to one implementation, a network device may include a set of ingress modules, a set of egress modules, and a set of switches. One of the ingress modules may receive an incoming stream of data over a group of timeslots, and output a portion of the data associated with a first one of the timeslots. Each of the switches may include a set of ingress links and a set of egress links. One of the ingress links may connect to the one of the ingress modules. One of the egress links may connect to one of the egress modules. The first one of the timeslots may be associated with the one of the ingress links. Each of the switches may store mapping information that maps the first one of the timeslots to a second one of the timeslots, where the second one of the timeslots may be associated with the one of the egress links. One of the switches may receive at least a subset of the portion of the data, identify, based on the mapping information, the second one of the timeslots, and output the at least a subset of the portion of the data on the one of the egress links to the one of the egress modules. The one of the egress modules may receive the portion of the data, and output the portion of the data, during the second one of the timeslots, on an outgoing data stream.

According to another implementation, a method, performed by a network device, may include storing mapping information associated with each of a set of switches, each of the switches may include a set of ingress links and a set of egress links, the mapping information may map a first timeslot, associated with one of the ingress links, to a second timeslot, associated with one of the egress links; receiving, at each of the switches, data, associated with the first timeslot, on the one of the ingress links; identifying the second timeslot and the one of the egress links, associated with the first timeslot and the one of the ingress links, based on the mapping information; and outputting, by each of the switches, the data, during the second timeslot, on the one of the egress links.

According to yet another implementation, a device may include a set of switches. Each of the switches may include a set of ingress links and a set of egress links. One of the switches may store mapping information that identifies a first timeslot and one of the egress links for data received, during a second timeslot, on one of the ingress links. The one of the switches may receive data, associated with the second timeslot, on the one of the ingress links, identify the first timeslot and the one of the egress links, associated with the second timeslot and the one of the ingress links, based on the mapping information, and output the data, during the first timeslot, on the one of the egress links.

According to a further implementation, a switch may include a set of ingress modules, a set of switches, a set of egress modules, and a memory. A first one of the ingress modules may receive a first stream segmented into a group of first timeslots, supply a first portion of data, associated with one of the first timeslots, to a first one of the switches, and supply a second portion of data, associated with the one of the first timeslots, to a second one of the switches. One of the egress modules may be coupled to the first and second ones of the switches. The memory may store mapping information associated with the switches. Based on the mapping information, the first one of the switches may supply the first portion of the data to the one of the egress modules during one of a group of second timeslots, and the second one of the switches may supply the second portion of the data to the one of the egress modules during the one of the second timeslots. The one of the egress modules may have an output that supplies the first and second portions of data during the one of the second timeslots.

According to another implementation, a switching system may include a first physical unit, a second physical unit, and a group of third physical units connected to the first and second physical units. The first physical unit may house an ingress module that may receive an incoming stream of data over a group of timeslots, divide a portion of data, associated with a first one of the timeslots, into a number of blocks of data, and output the blocks of data. One of the third physical units may house a group of switch managers and a group of switches. One of the switch managers may receive an incoming stream of blocks of data over a group of timeslots, divide one of the blocks of data, associated with the first one of the timeslots, into a number of sub-blocks of data, and output the sub-blocks of data. One of the switches may receive one of the sub-blocks of data, identify, based on mapping information accessible by the one of the switches, a second one of the timeslots, and output the one of the sub-blocks of data for transmission by the egress module during the second one of the timeslots.

According to yet another implementation, a switching system may include an ingress module, an egress module, a group of switch managers, and a group of switches. The ingress module may receive an incoming stream of data over a number of timeslots, divide a portion of data, associated with a first one of the timeslots, into a number of blocks of data, and output the blocks of data. One of the switch managers may receive an incoming stream of blocks of data over a number of timeslots, divide one of the blocks of data, associated with the first one of the timeslots, into a number of sub-blocks of data, and output the sub-blocks of data. One of the switches may receive one of the sub-blocks of data, identify, based on mapping information accessible by the one of the switches, a second one of the timeslots, and output the one of the sub-blocks of data for transmission by the egress module during the second one of the timeslots.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Implementations, described herein, may provide a switching architecture that can perform TDM switching operations. In one implementation, the switching architecture may include a switch that can be programmed to perform a fully non-blocking transfer of timeslot data between a particular timeslot on an ingress switch link to a particular timeslot on an egress switch link. As a result, incoming data need not include information for transferring the data within the switching architecture because the switch is programmed with the information necessary to transfer the data.

Exemplary Network

Figure 1:
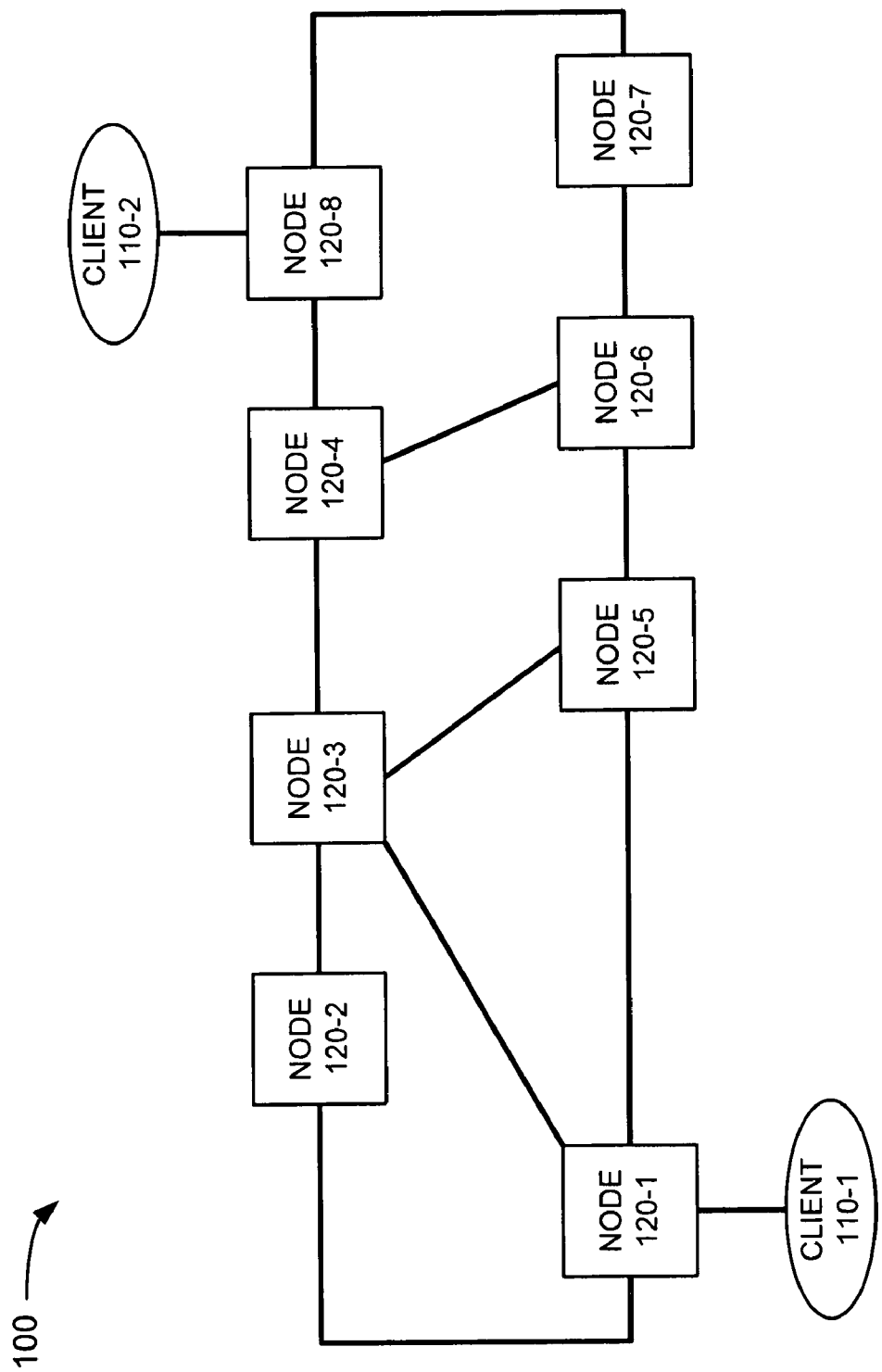
FIG. 1 is a diagram of an exemplary network in which systems and/or methods described herein may be implemented.

FIG. 1 is a diagram of an exemplary network 100 in which systems and/or methods described herein may be implemented. For example, network 100 may include clients 110-1 and 110-2 (referred to collectively as "clients 110," and individually as "client 110") and nodes 120-1, . . . , 120-8 (referred to collectively as "nodes 120," and individually as "node 120"). While FIG. 1 shows a particular number and arrangement of components, network 100 may include additional, fewer, different, or differently arranged components than those illustrated in FIG. 1. Also, the connections between components may include direct or indirect connections.

Client 110 may include any type of network device, such as a router, a switch, or a central office, that may transmit data traffic. In one implementation, client 110 may transmit a client signal (e.g., a synchronous optical network (SONET) signal, a synchronous digital hierarchy (SDH) signal, an Ethernet signal, or another type of signal) to node 120. The client signal may conform to any payload type, such as Gigabit Ethernet (GbE), 2xGbE, Fibre Channel (FC), 1GFC, 10GbE LAN Phy, 10GbE WAN Phy, Synchronous Transport Mode 16 (STM-16), STM-64, Optical Carrier level 48 (OC-48), and OC-192.

Node 120 may include a dense wavelength division multiplexing (DWDM) device. Node 120 may perform optical multiplexing operations (e.g., receive individual client signals on individual optical links and generate a multi-wavelength signal that may be transmitted on a single optical link), optical amplification operations (e.g., amplify the multi-wavelength signal), optical add-drop multiplexing operations (e.g., remove one or more client signals from the multi-wavelength signal), and/or optical demultiplexing operations (e.g., receive the multi-wavelength signal and separate the multi-wavelength signal back into individual client signals that may be transmitted on individual optical links). To perform these operations, node 120 may contain various components, such as an optical multiplexer (to perform the optical multiplexing operations), an optical amplifier (to perform the optical amplification operations), an optical add-drop multiplexer (e.g., a remotely configurable add/drop multiplexer (ROADM)) (to perform the optical add-drop multiplexing operations), and/or an optical demultiplexer (to perform the optical demultiplexing operations).

Nodes 120 may be connected via optical links. Data traffic may flow from node-to-node over a series of optical links. Any two nodes 120 may connect via multiple optical links. For bidirectional communication, for example, an optical link (commonly referred to as a "working link") may be dedicated for data traffic transmitted in one direction, another optical link (also commonly referred to as a "working link") may be dedicated for data traffic transmitted in the opposite direction, and yet another optical link (commonly referred to as a "protection link") may be used in case of a failure on a working link. In practice, there may be N working links and M protection links between two nodes 120, where $M \leq N$.

Exemplary Node Components

Figure 2:
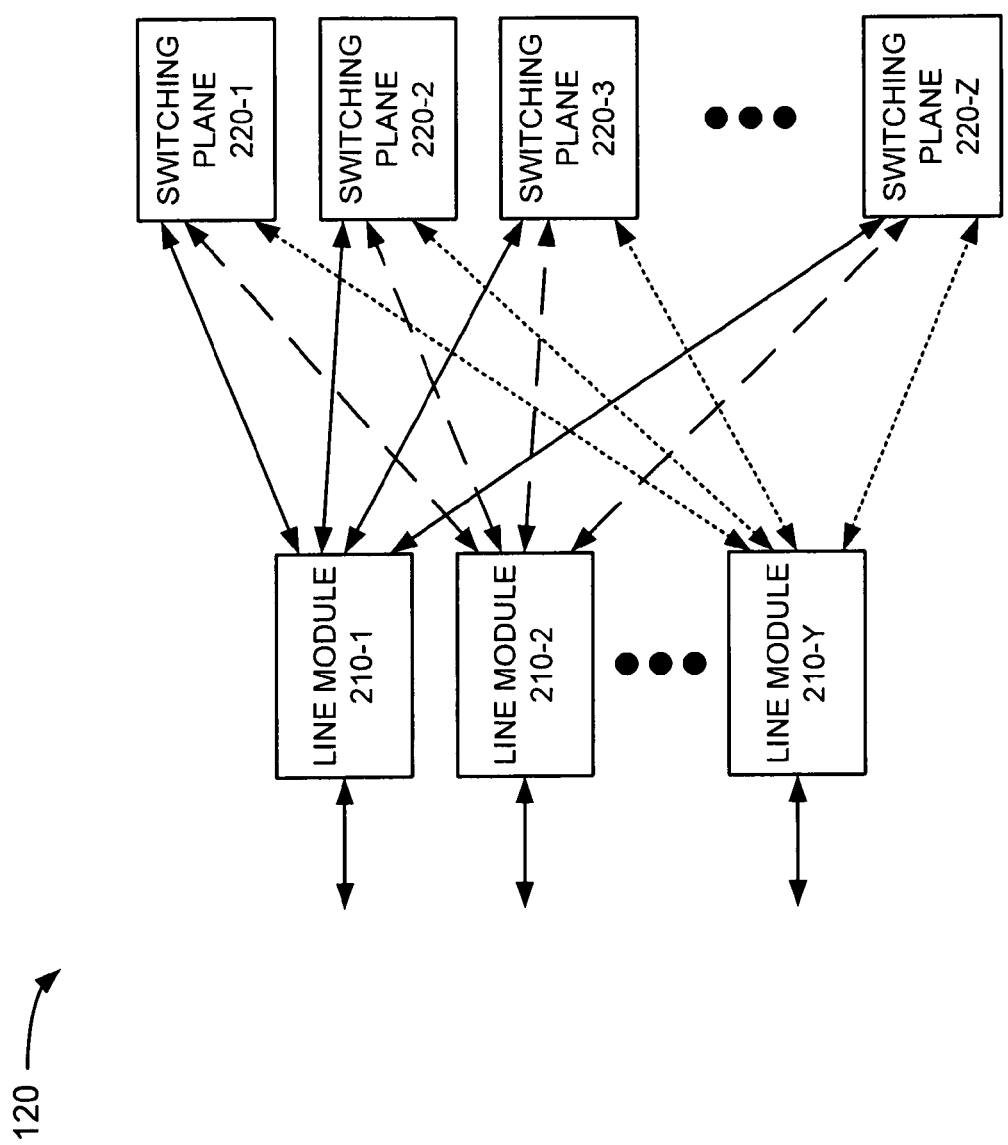
FIG. 2 is a diagram of exemplary components of a node of FIG. 1.

FIG. 2 is a diagram of exemplary components of node 120. As shown in FIG. 2, node 120 may include line modules 210-1, 210-2, . . . , 210-Y (referred to collectively as "line modules 210," and individually as "line module 210") (where $Y \geq 1$) connected to switching planes 220-1, 220-2, . . . 220-Z (referred to collectively as "switching planes 220," and individually as "switching plane 220") (where $Z \geq 1$). While FIG. 2 shows a particular number and arrangement of components, node 120 may include additional, fewer, different, or differently arranged components than those illustrated in FIG. 2. For example, node 120 may also include one or more tributary modules that may support flexible adding-dropping of multiple services, such as SONET/SDH services, GbE services, optical transport network (OTN) services, and FC services. Also, it may be possible for one of the components of node 120 to perform a function that is described as being performed by another one of the components.

Line module 210 may include hardware components, or a combination of hardware and software components, that may provide network interface operations. Line module 210 may receive a multi-wavelength optical signal and/or transmit a multi-wavelength optical signal. A multi-wavelength optical signal may include a number of optical signals of different optical wavelengths. In one implementation, line module 210 may perform retiming, reshaping, regeneration, time division multiplexing, and/or recoding services for each optical wavelength.

Switching plane 220 may include hardware components, or a combination of hardware and software components, that may provide switching functions to transfer data between line modules 210. In one implementation, switching plane 220 may provide fully non-blocking transfer of data. As to be explained below, switching plane 220 may be programmed to transfer data from a particular input to a particular output.

As shown in FIG. 2, each of line modules 210 may connect to each of switching planes 220. The connections between line modules 210 and switching planes 220 may be bidirectional. While a single connection is shown between a particular line module 210 and a particular switching plane 220, the connection may include a pair of unidirectional connections (i.e., one in each direction). A connection from a line module 210 to a switching plane 220 will be referred to herein as an "ingress switch link," and a connection from a switching plane 220 to a line module 210 will be referred to as an "egress switch link."

Figure 3:
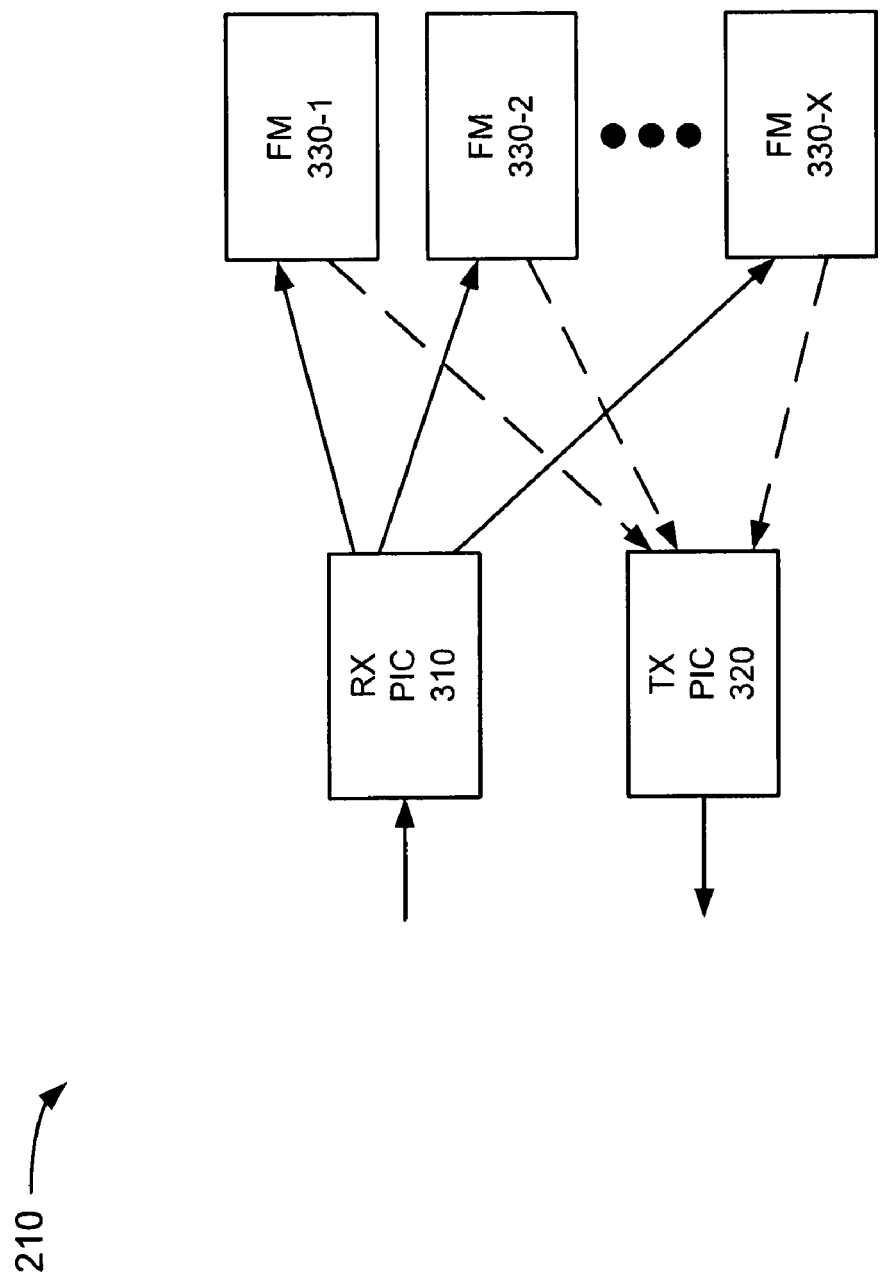
FIG. 3 is a diagram of exemplary components of a line module of FIG. 2.

FIG. 3 is a diagram of exemplary components of a line module 210. As shown in FIG. 3, line module 210 may include a receiver (RX) photonic integrated circuit (PIC) 310, a transmitter (TX) PIC 320, and fabric managers (FMs) 330-1, 330-2, . . . , 330-X (referred to collectively as "FMs 330," and individually as "FM 330") (where $X \geq 1$). While FIG. 3 shows a particular number and arrangement of components, line module 210 may include additional, fewer, different, or differently arranged components than those illustrated in FIG. 3. Also, it may be possible for one of the components of line module 210 to perform a function that is described as being performed by another one of the components.

Receiver PIC 310 may include hardware, or a combination of hardware and software, that may receive a multi-wavelength optical signal, separate the multi-wavelength signal into signals of individual wavelengths, and convert the signals to digital form. In one implementation, receiver PIC 310 may include components, such as a photodetector, a demultiplexer, and/or an optical-to-electrical converter. Transmitter PIC 320 may include hardware, or a combination of hardware and software, that may convert signals from digital form, combine the signals of the individual wavelengths into a multi-wavelength signal, and transmit the multi-wavelength signal. In one implementation, transmitter PIC 320 may include components, such as an electrical-to-optical converter, a multiplexer, and/or a laser. As shown in FIG. 3, receiver PIC 310 and transmitter PIC 320 may connect to each of FMs 330. Receiver PIC 310 may transfer data to FMs 330. Transmitter PIC 320 may receive data from FMs 330.

Figure 4:
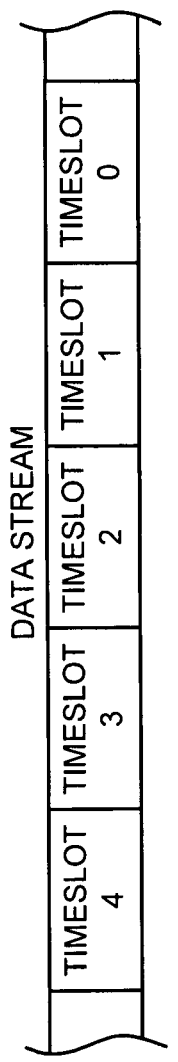
FIG. 4 is a diagram of an exemplary data stream divided into a sequence of timeslots.

FM 330 may include hardware, or a combination of hardware and software, that may process digital signals for transmission to switching plane 220 or transmitter PIC 320. In one implementation, FM 330 may receive a stream of data from receiver PIC 310 and divide the stream into chunks of continuous bytes, called "timeslots," associated with particular channels (e.g., a channel may refer to a communication between a particular source and a particular destination), as shown in FIG. 4. In one implementation, each timeslot may include the same quantity of bytes (e.g., each timeslot may contain an equal amount of bandwidth). In another implementation, each timeslot may not include the same quantity of bytes (e.g., at least one timeslot may contain a different amount of bandwidth). The stream of data received by FM 330 may, in one implementation, already be segmented into timeslots. In this situation, when dividing the stream into timeslots, FM 330 may identify the timeslots based on, for examples, identifiers in the stream.

Figure 5:
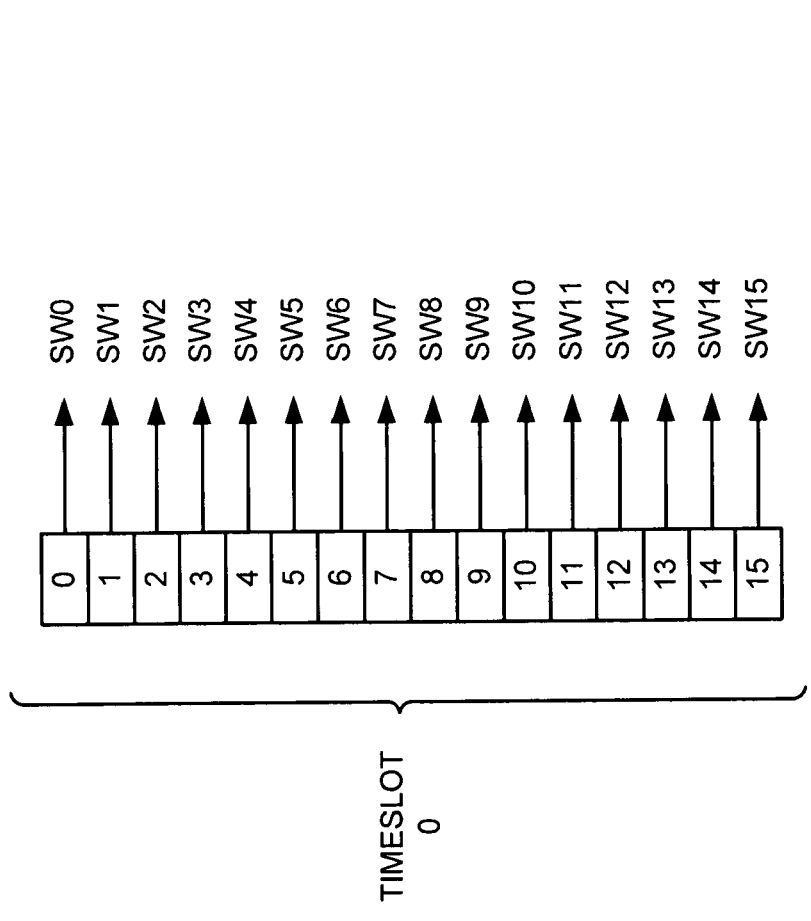
FIG. 5 is a diagram of an exemplary timeslot divided into a sequence of blocks.

FM 330 may divide the data in each timeslot into a number of equal-bandwidth blocks of data. In one implementation, the quantity of blocks may equal the quantity of switches available in switching planes 220. Assume, for example, that there are sixteen switches available in switching planes 220. In this case, FM 330 may divide the data in a timeslot into sixteen equal blocks, as shown in FIG. 5. FM 330 may send each of the blocks to a different one of the switches, which is shown in FIG. 5 as arrows pointing to SW0 through SW15. In one implementation, FM 330 may sequentially send each of the blocks in a round robin fashion. In another implementation, FM 330 may send out each of the blocks in another systematic fashion.

Figure 6:
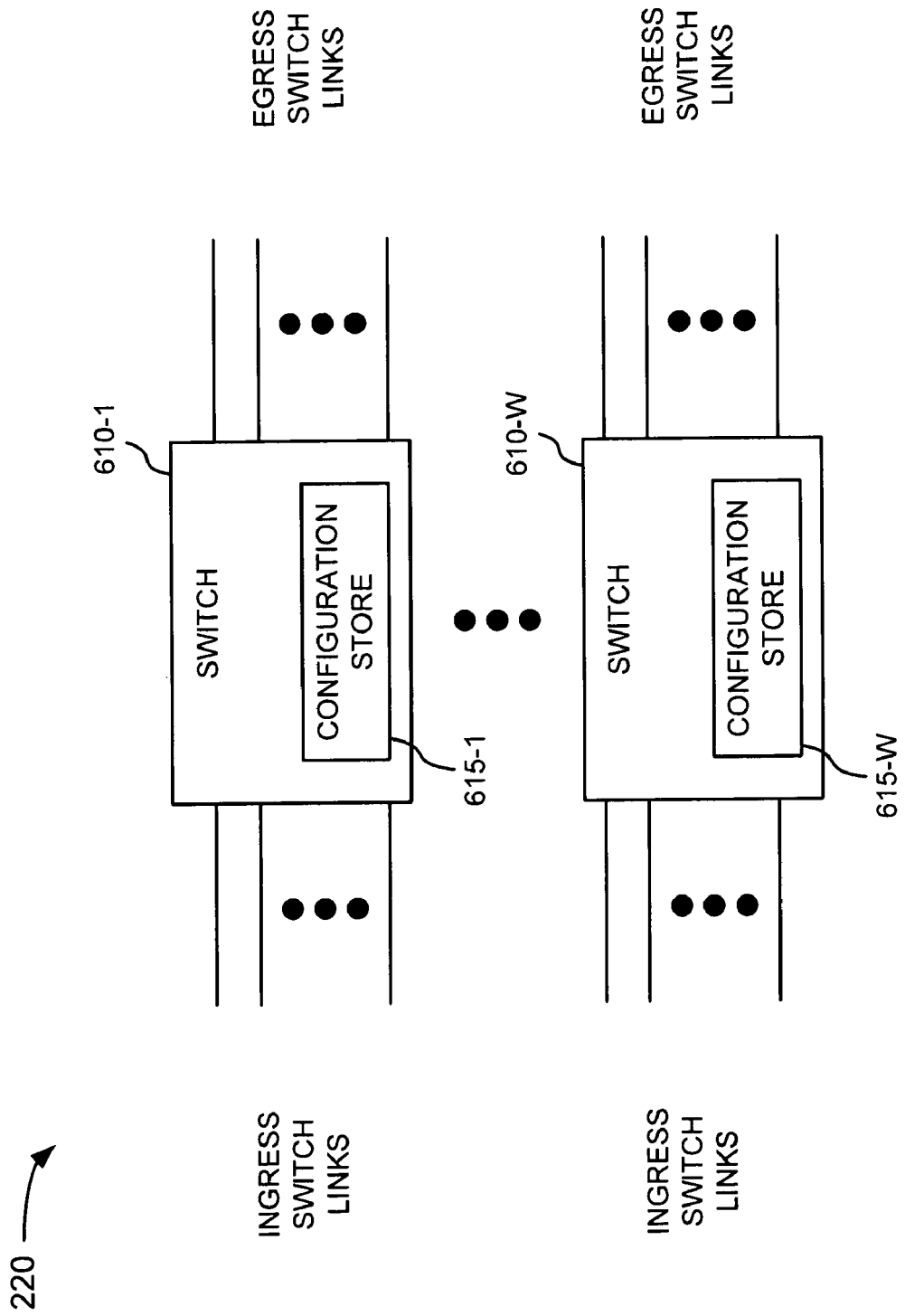
FIG. 6 is a diagram of exemplary components of a switch plane of FIG. 2.

FIG. 6 is a diagram of exemplary components of a switching plane 220. As shown in FIG. 6, switching plane 220 may include switches 610-1, . . . , 610-W (referred to collectively as "switches 610," and individually as "switch 610") (where $W \geq 1$). While FIG. 6 shows a particular number and arrangement of components, switching plane 220 may include additional, fewer, different, or differently arranged components than those illustrated in FIG. 6. Also, it may be possible for one of the components of switching plane 220 to perform a function that is described as being performed by another one of the components.

Switch 610 may include hardware, or a combination of hardware and software, that may transfer a block of data received in a timeslot on an ingress switch link to a timeslot on an egress switch link, where the timeslot on the ingress switch link may differ from the timeslot on the egress switch link. Switch 610 may include a set of ingress switch links via which data is received, and a set of egress switch links via which data is transmitted. Each ingress switch link and egress switch link may connect to a particular FM 330.

Switch 610 may include a configuration store 615. Configuration store 615 may store mapping information that instructs switch 610 on which egress switch link and in what timeslot to send a block of data received within a particular timeslot on a particular ingress switch link. The mapping information may be programmed by an operator of node 120 on a per node 120 basis, and may remain fixed until changed by the operator. Alternatively, the mapping information may be programmed under the control of a network-level routing and signaling algorithm, and may remain fixed until changed by the algorithm. In one implementation, each of switches 610 may store identical mapping information. In other words, each of switches 610 may be programmed to map timeslot A on its ingress switch link B to timeslot C on its egress switch link D.

In one implementation, configuration store 615 may store the mapping information in the form of a table, such as Table I provided below.

TABLE I

| Egress Switch Link | Egress Timeslot | Ingress Switch Link | Ingress Timeslot |
|---|---|---|---|
| #8 | #14 | #1 | #10 |

Table I may identify an ingress switch link and ingress timeslot (e.g., a timeslot on the ingress switch link) for each egress switch link and egress timeslot (e.g., a timeslot on the egress switch link). As shown in Table I, for example, the mapping information may map timeslot #10 on ingress switch link #1 to timeslot #14 on egress switch link #8.

Figure 7:
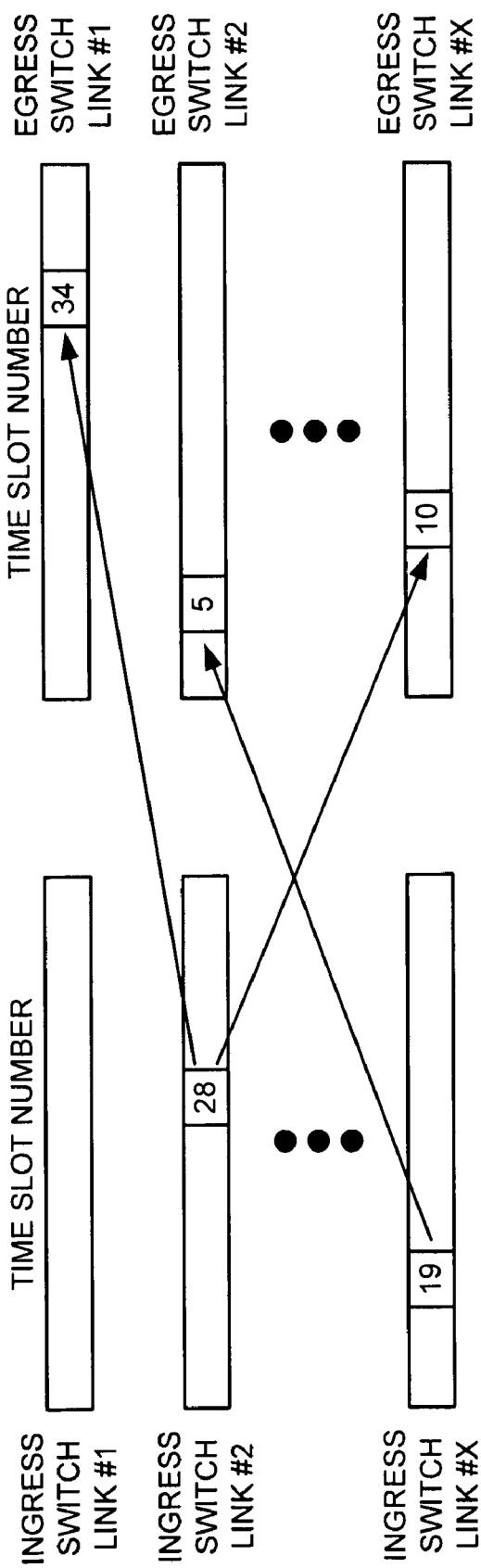
FIG. 7 is a diagram of an exemplary link, timeslot mapping that may be performed by a switch.

FIG. 7 is a diagram of an exemplary link, timeslot mapping that may be performed by switch 610. As shown in FIG. 7, switch 610 may connect to X ingress switch links and X egress switch links. Data on each switch link may be divided into timeslots, as described above. Switch 610 may be programmed to always map a particular timeslot on a particular ingress switch link to a certain timeslot on a certain egress switch link. In some situations, switch 610 may be programmed to map a particular timeslot on a particular ingress switch link to multiple timeslots on multiple egress switch links (e.g., to perform multicasting).

FIG. 7 shows two exemplary mappings. For example, switch 610 may be programmed to map timeslot 28 on ingress switch link 2 to timeslot 34 on egress switch link 1 and to timeslot 10 on egress switch link X (i.e., to perform multicasting). Switch 610 may also be programmed to map timeslot 19 on ingress switch link X to timeslot 5 on egress switch link 2. Accordingly, each ingress switch link, timeslot combination may be mapped to one or more egress switch link, timeslot combinations. Thus, switches 610 may support unlimited multicasting, where data transmitted during a particular timeslot on an ingress switch link may be transmitted during multiple timeslots on one or more egress switch links.

In one implementation, the mapping information may be stored in configuration stores 615 symmetrically for switches 610. When a channel is added, or deleted, no reassignment of unaffected channels is needed. Hence, there is no requirement for a reconfiguration algorithm, which is typically necessary in prior rearrangeably non-blocking architectures. Prior rearrangeably non-blocking architectures were synchronous when switching over to a new configuration (adding or deleting a channel)—i.e., the change in programming of the switch, ingress, and egress needed to all be synchronized so that the new channel could be added without disturbing existing channels at the egress. This kind of synchronization requires a lot of complexity. By contrast, the programming of switches 615 does not require synchronization. When a new channel is added, there is always an available timeslot for the new channel, so a connection can be set up from ingress to egress without changing any existing channels.

Exemplary Process

Figure 8:
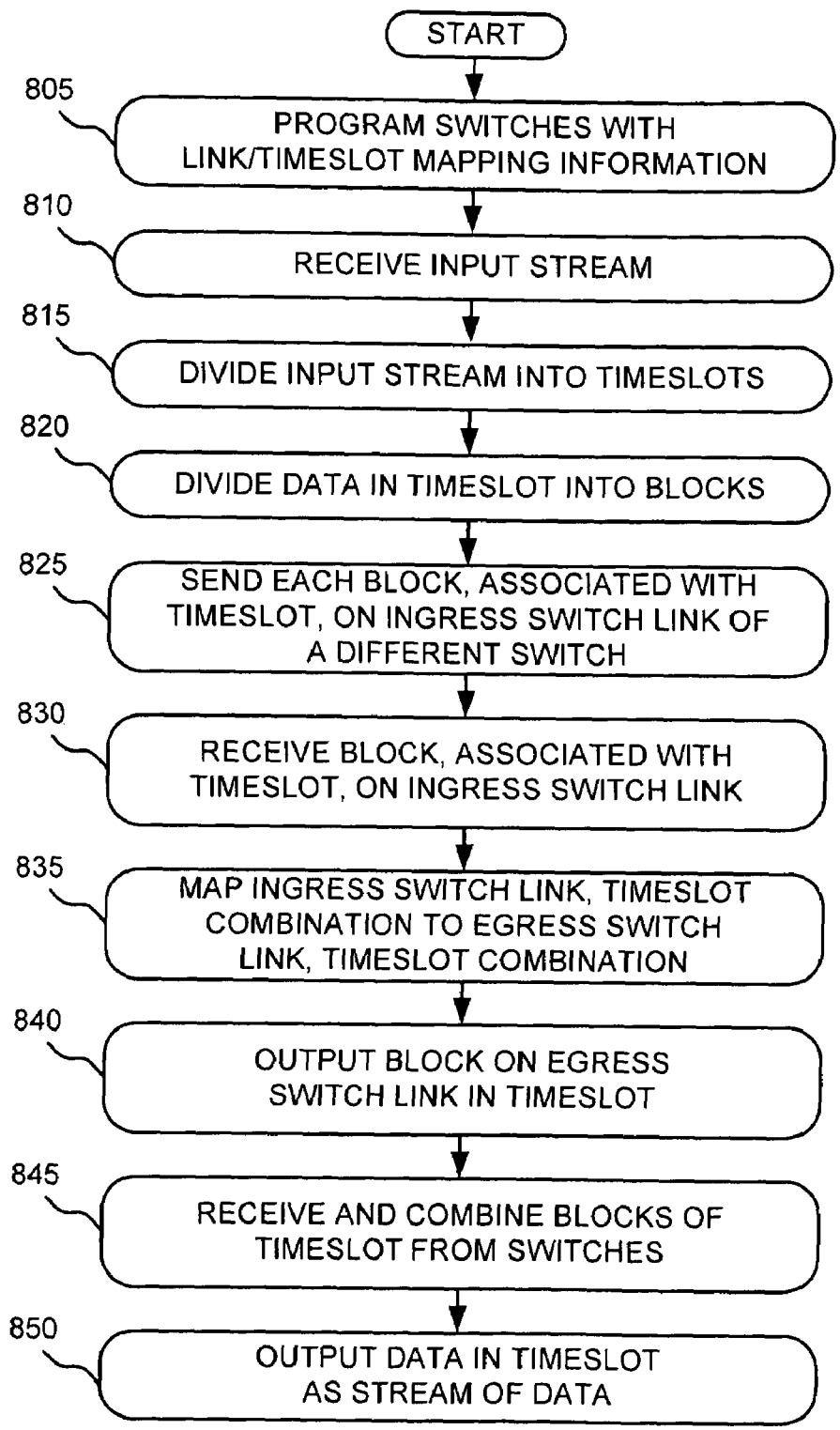
FIG. 8 is a flowchart of an exemplary process for performing TDM switching.

FIG. 8 is a flowchart of an exemplary process for performing TDM switching. The process of FIG. 8 may be performed by one or more components within a node 120.

The process of FIG. 8 may begin with the programming of the switches with link/timeslot mapping information (block 805). For example, an operator may program configuration store 615 of each switch 610 to store mapping information that maps each particular timeslot on each of the ingress switch links to a certain timeslot on a certain egress switch link. Alternatively, or additionally, configuration stores 615 may be programmed under the control of a network-level routing and signal algorithm. In one implementation, each configuration store 615 may contain identical mapping information.

An input stream may be received (block 810). For example, a line module 210 may receive a multi-wavelength optical signal, separate the multi-wavelength signal into signals of individual wavelengths, and convert the signals to a stream of digital data ("data stream"). A FM 330, within line module 210, may receive the data stream. This FM 330 will be referred to as an ingress FM 330.

The input stream may be divided into timeslots (block 815). For example, ingress FM 330 may divide the data stream into chunks of continuous bytes, called "timeslots," associated with particular channels. In one implementation, a timeslot may include twenty-five contiguous bytes. In another implementation, a timeslot may include additional or fewer bytes. As described above, each timeslot may include the same quantity of bytes (e.g., the same amount of bandwidth). Alternatively, at least one of the timeslots may include a different quantity of bytes (e.g., a different amount of bandwidth). As described above, the data stream received by ingress FM 330 may, in one implementation, already be segmented into timeslots. In this situation, when dividing the data stream into timeslots, ingress FM 330 may identify the timeslots based on, for examples, identifiers in the data stream.

The data in each timeslot may be divided into blocks (block 820). For example, ingress FM 330 may divide the data in each timeslot into a number of equal-bandwidth blocks. In one implementation, as explained above, the quantity of blocks may equal the quantity of switches 610 available in switching planes 220.

Each block may be sent on an ingress switch link of a different switch (block 825). For example, ingress FM 330 may send each of the blocks, associated with a particular timeslot, to a different one of switches 610. In one implementation, ingress FM 330 may sequentially send each of the blocks in a round robin, or another systematic, fashion.

A block, associated with a particular timeslot, may be received on an ingress switch link (block 830). For example, ingress FM 330 may send a block, associated with a timeslot, to a switch 610 on a particular ingress switch link. Switch 610 may receive the block on the ingress switch link.

A combination of an ingress switch link and a timeslot may be mapped to a combination of an egress switch link and a timeslot (block 835). For example, as explained above, a switch 610 may be programmed to map any particular ingress switch link, timeslot combination to any particular egress switch link, timeslot combination. In one implementation, switch 610 may receive a block, associated with a timeslot, on a particular ingress link. Switch 610 may identify, based on the mapping information in configuration store 615, an egress switch link and timeslot on which to transmit the block. Switch 610 may transfer the block from the ingress switch link to the egress switch link in a fully non-blocking manner.

The block may be outputted on the egress switch link in the timeslot (block 840). For example, switch 610 may, based on the egress switch link and timeslot combination identified in block 835, output the block on the egress switch link in the timeslot. The egress switch link may connect to a particular FM 330. This particular FM 330 will be referred to as egress FM 330.

Blocks, associated with a particular timeslot, may be received from switches 610 (block 845). For example, egress FM 330 may receive all of the blocks associated with the particular timeslot. Each of these blocks may be received from a different one of switches 610. Egress FM 330 may combine the blocks in the appropriate order to reconstruct the data in the timeslot. Because ingress FM 330 may transmit each of the blocks consecutively to a different one of switches 610 and each of switches 610 may perform the same transfer operations, the blocks may be received by egress FM 330 in the same order in which the blocks were transmitted by ingress FM 330.

The timeslot data may be outputted as a stream of data (block 850). For example, egress FM 330 may form a stream of data from a set of timeslot data received by egress FM 330. Egress FM 330 may place each timeslot data in its appropriate place (i.e., in its timeslot) within the data stream. Egress FM 330 may then output the data stream.

Example

Figure 9:
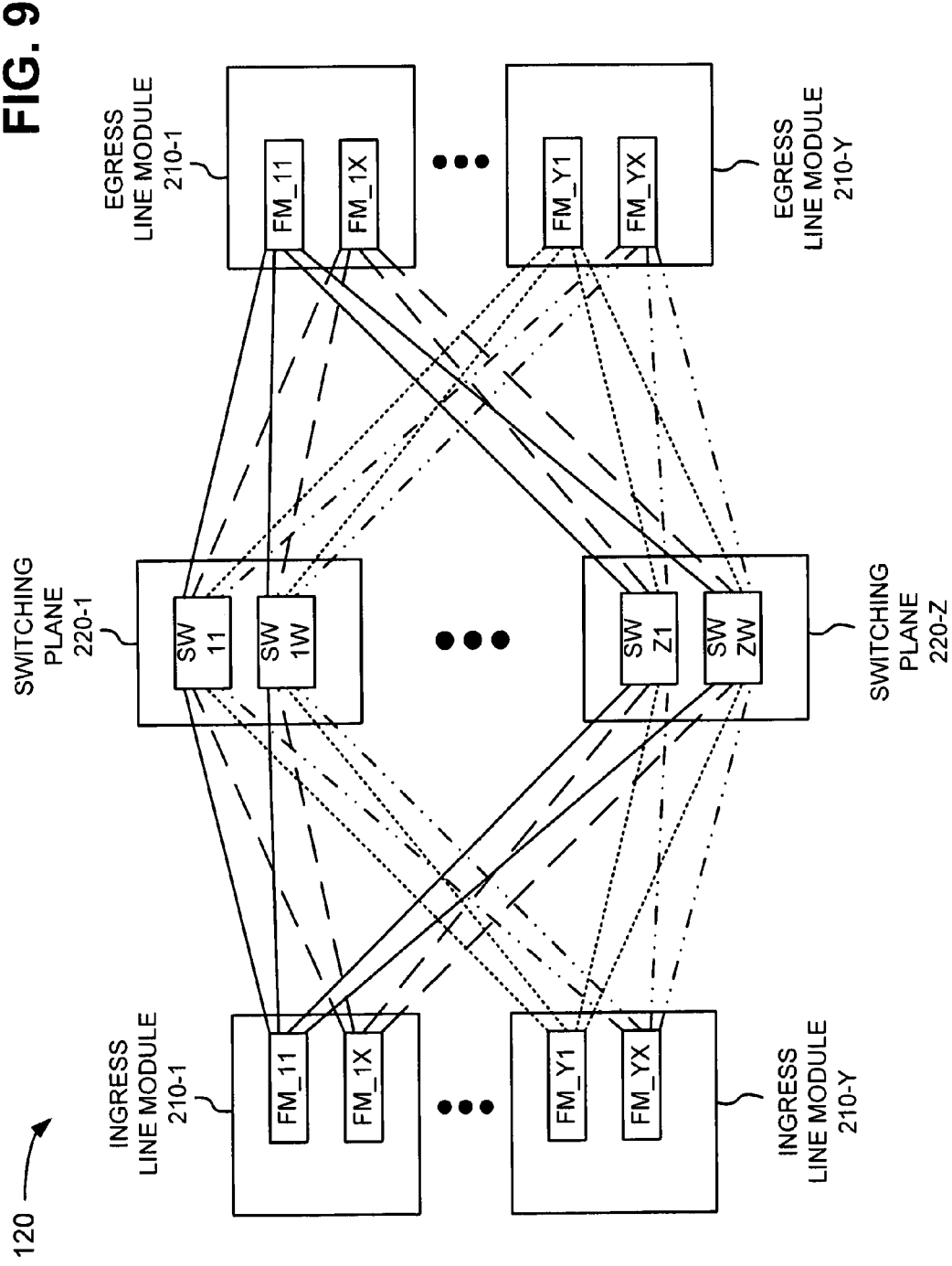
FIGS. 9-11 are diagrams illustrating an exemplary TDM switching process.
Figure 10:
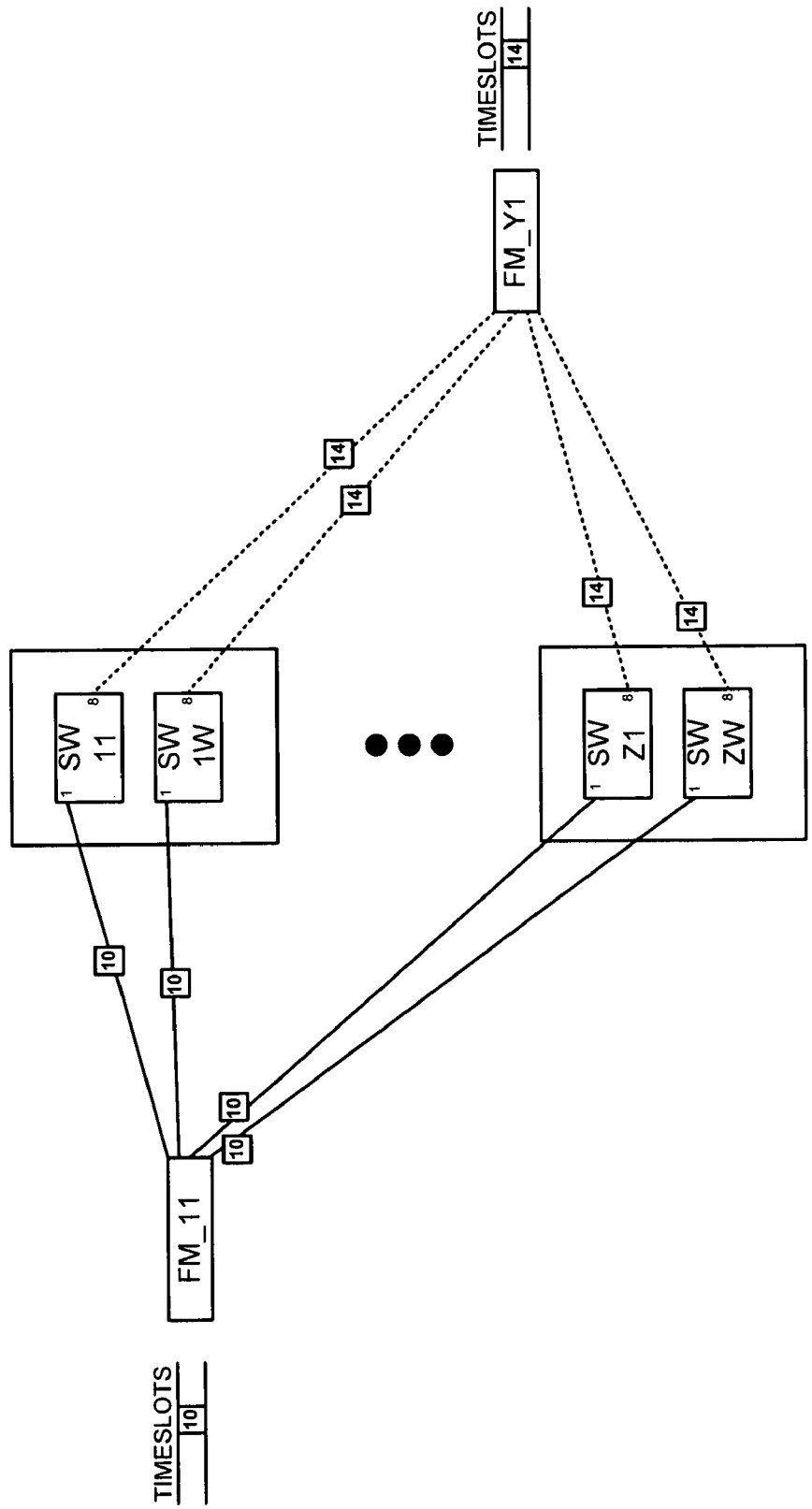
Figure 11:
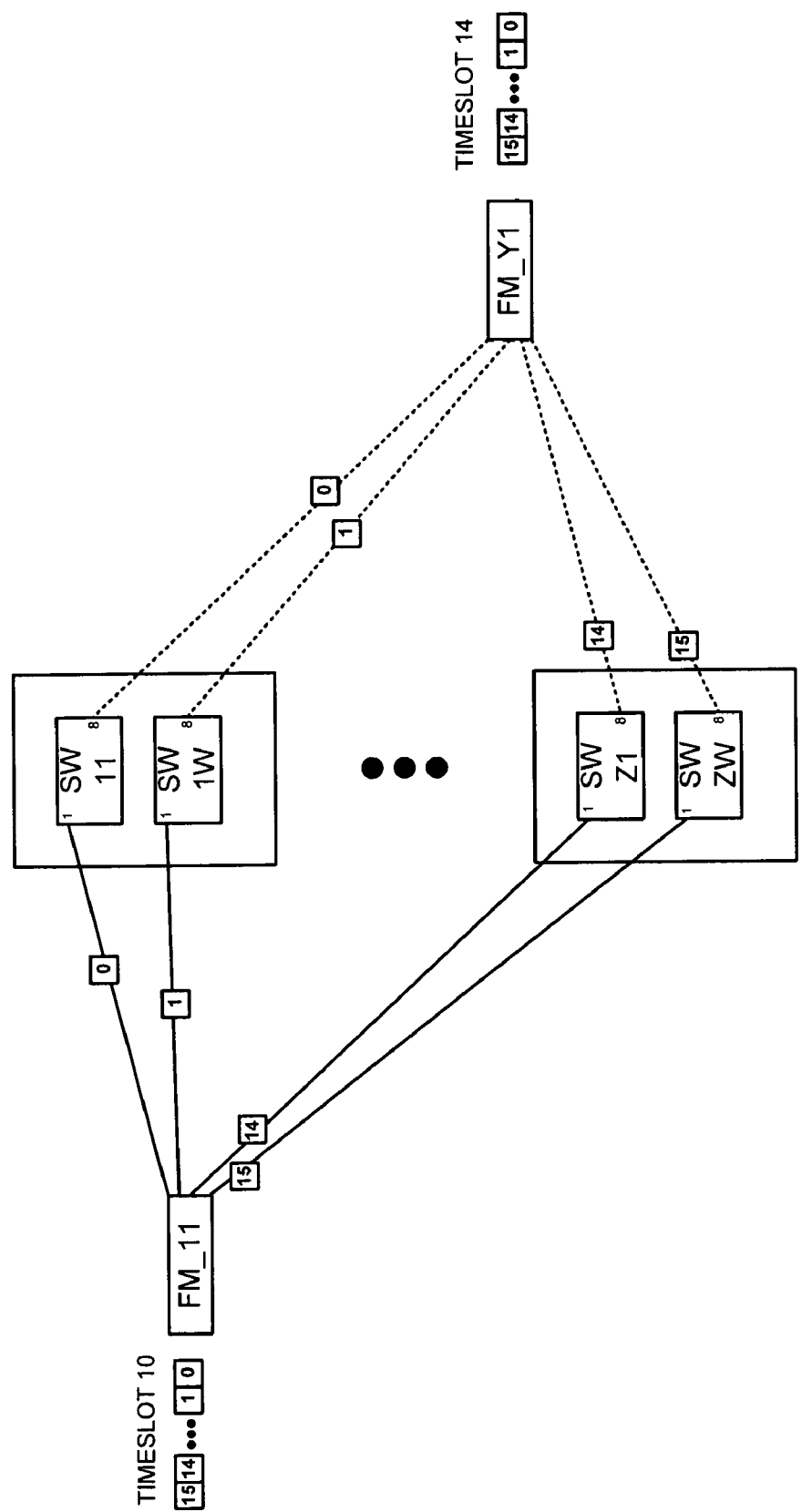

FIGS. 9-11 are diagrams illustrating an exemplary TDM switching process. As shown in FIG. 9, a node 120 may include ingress and egress line modules 210 connected to a set of switching planes 220. This is the same arrangement of components that is described with regard to FIGS. 2-6. FIG. 9 illustrates, however, the set of connections between the fabric managers (FMs) and the switches (SWs). As shown in FIG. 9, each FM (e.g., FM_11) may connect to each of the switches (e.g., SW_11, SW_1W, ..., SW_Z1, SW_ZW). In one implementation, an FM (e.g., FM_11) may connect to the same ingress switch link on each of the switches (e.g., ingress switch link 1 on each of the switches).

While FIG. 9 shows the ingress line modules 210 operating as both ingress line modules 210 and egress line modules 210, this need not be the case. In another implementation, ingress line modules 210 and egress line modules 210 may perform dedicated ingress and egress operations, respectively.

As shown in FIG. 10, assume that a particular FM (labeled as FM_11 in FIG. 10) receives an incoming data stream with data in a timeslot 10 that is to be transmitted by another FM (labeled as FM_Y1 in FIG. 10) in timeslot 14 of an outgoing data stream. FM_11 may receive the incoming data stream and divide the data stream into timeslots. FM_11 may transmit the data in timeslot 10 on a particular ingress switch link (e.g., ingress switch link 1) to each of the switches (labeled as SW_11, SW_1W, ..., SW_Z1, SW_ZW in FIG. 10).

Each of the switches may be programmed with identical mapping information. In this example, assume that the switches are programmed to transmit data, received on ingress switch link 1 in timeslot 10, on egress switch link 8 in timeslot 14. Accordingly, the switches may receive the data, of timeslot 10, on ingress switch link 1 and transmit the data on egress switch link 8 in timeslot 14.

Assume that egress switch link 8, from each of the switches, connects to a particular FM (e.g., FM_Y1). Thus, the data transmitted by the switches on egress switch link 8 may be received by FM_Y1. FM_Y1 may insert the timeslot 14 data in timeslot 14 of the data stream outputted by FM_Y1.

FIG. 11 provides a different view of the example of FIG. 10. As shown in FIG. 11, assume that a particular FM (labeled as FM_11 in FIG. 11) receives an incoming data stream with data in a timeslot 10 that is to be transmitted by another FM (labeled as FM_Y1 in FIG. 10) in timeslot 14 of an outgoing data stream. FM_11 may receive the incoming data stream and divide the data stream into timeslots. FM_11 may further divide the data in timeslot 10 into blocks (shown as blocks 0-15 in FIG. 11). FM_11 may sequentially transmit each of the blocks on a particular ingress switch link (e.g., ingress switch link 1) to each of the switches (labeled as SW_11, SW_11W, ..., SW_ZL, SW_ZW in FIG. 10).

Each of the switches may be programmed with identical mapping information. In this example, assume that the switches are programmed to transmit data, received on ingress switch link 1 in timeslot 10, on egress switch link 8 in timeslot 14. Accordingly, the switches may receive the blocks, of timeslot 10, on ingress switch link 1 and transmit the blocks on egress switch link 8 in timeslot 14.

Assume that egress switch link 8, from each of the switches, connects to a particular FM (e.g., FM_Y1). Thus, the blocks transmitted by the switches on egress switch link 8 may be received by FM_Y1. FM_Y1 may combine the blocks to reform the data of timeslot 14. FM_Y1 may then transmit the data in timeslot 14 of the data stream outputted by FM_Y1.

Alternative Exemplary Node Components

Figure 12:
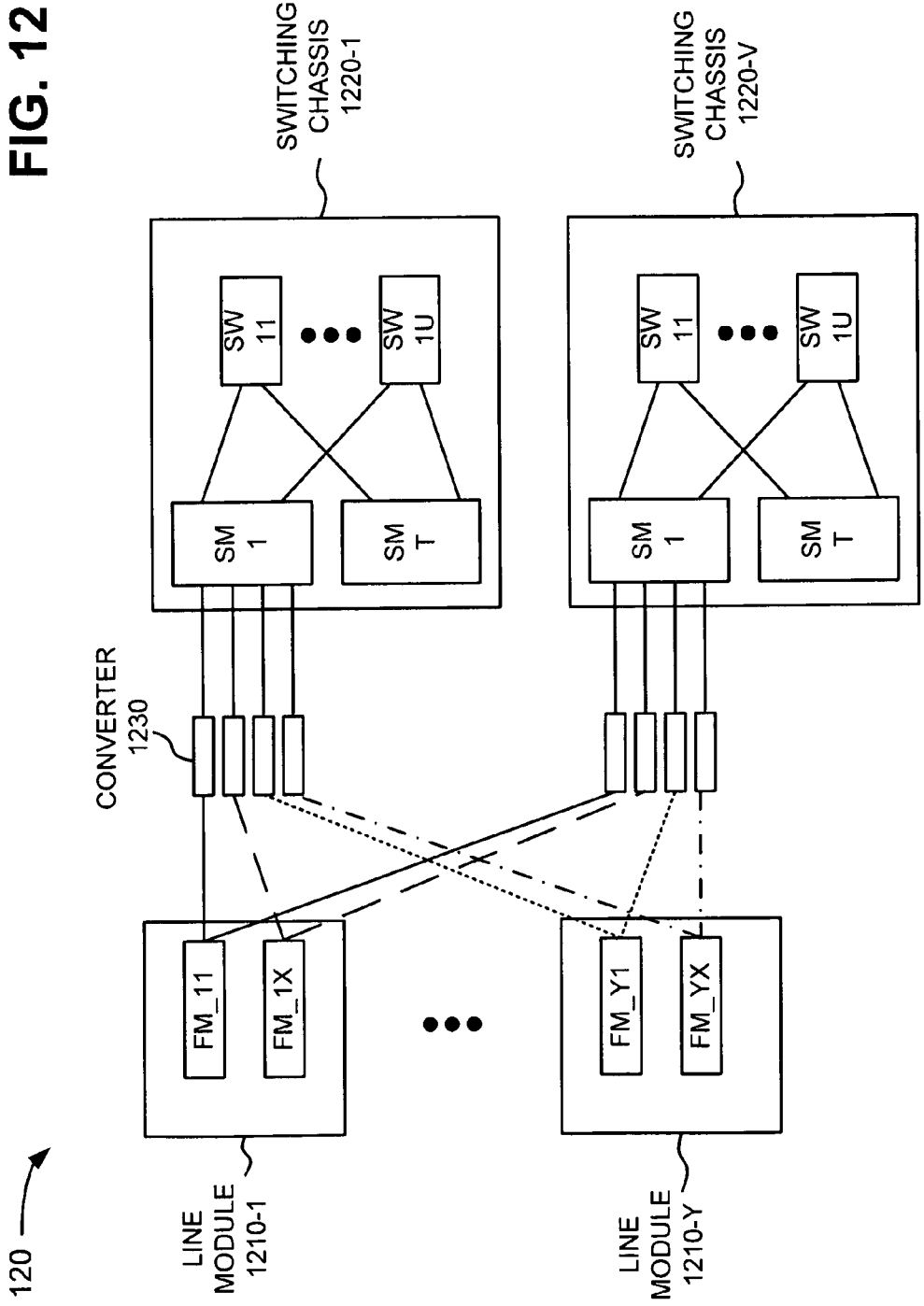
FIG. 12 is a diagram of an alternative set of components of a node of FIG. 1.

FIG. 12 is a diagram of an alternative set of components of a node 120. As shown in FIG. 12, node 120 may include line modules 1210-1, ..., 1210-Y (referred to collectively as "line modules 1210," and individually as "line module 1210") (where Y≧1) connected to switching chassis 1220-1, ... 1220-V (referred to collectively as "switching chassis 1220," and individually as "switching chassis 1220") (where V≧1) via converters 1230. While FIG. 12 shows a particular number and arrangement of components, node 120 may include additional, fewer, different, or differently arranged components than those illustrated in FIG. 12. For example, node 120 may also include one or more tributary modules that may support flexible adding-dropping of multiple services, such as SONET/SDH services, GbE services, OTN services, and FC services. Also, it may be possible for one of the components of node 120 to perform a function that is described as being performed by another one of the components.

In the implementation shown in FIG. 12, node 120 may be constructed from separate, physical units. For example, line modules 1210 and/or converters 1230 may be housed in one physical unit, and a switching chassis 1220 may be housed in another physical unit. In one implementation, each switching chassis 1220 may be housed within its own physical unit separate from the physical unit housing line modules 1210. It may also be possible for one or more of line modules 1210 to be housed in a physical unit separate from a physical unit housing another one or more of line modules 1210. In another implementation, node 120, as shown in FIG. 12, may be housed in a same physical unit.

Line module 1210 may include hardware components, or a combination of hardware and software components, that may provide network interface operations. In one implementation, line module 1210 may include a receiver PIC and a transmitter PIC, as described above with regard to FIG. 3. Line module 1210 may also include fabric managers (FMs) 1, ..., X (referred to collectively as "FMs," and individually as "FM") (where X≧1). FMs may perform similar functions as described above. For example, FM may receive a stream of data and divide the stream into chunks of continuous bytes, called "timeslots," as shown in FIG. 4. FM may divide the data in each timeslot into a number of equal-bandwidth blocks. In one implementation, the quantity of blocks may equal the quantity of switching chassis 1220.

Converter 1230 may include an electrical-to-optical converter that may receive the blocks from the FMs and convert the blocks into optical signals. Converter 1230 may send the optical signals to a switching chassis 1220. In one implementation, converter 1230 may include a multi-channel optical device. In another implementation, converter 1230 may include a single channel optical device. In yet another implementation, converter 1230 may include an optical device that handles data, from multiple channels, that is interleaved over a single optical channel. While converter 1230 is shown in FIG. 12 as separate from line module 1210 and switching chassis 1220, this need not be the case. Converter 1230 may be housed in the physical unit housing line module 1210 or the physical unit housing switching fabric 1220. In the situation where node 120 is housed in a single physical unit, converter 1230 may include a different kind of converter than an electrical-to-optical converter, or converter 1230 may be omitted altogether.

Switching chassis 1220 may include switch managers (SMs) 1, ..., T (referred to collectively as "SMs," and individually as "SM") (where T≧1) connected to switches 1, ..., U (where U≧1). A SM may receive a stream of optical signals, convert the optical signals to an electrical data stream. The SM may divide the stream into chunks of continuous bytes, called "timeslots," as shown in FIG. 4. The SM may divide the data in each timeslot into a number of equal-bandwidth blocks. In one implementation, the quantity of blocks may equal the quantity of available switches. The SM may send the blocks to the switches. The switches may perform functions similar to the functions described above with regard to switches 610 of FIG. 6. In other words, each switch may connect any ingress switch link, timeslot combination to any egress switch link, timeslot combination. In other words, a FM may divide data from a timeslot into blocks and send the blocks to different switching chassis 1220. A SM, in a switching chassis 1220, may further divide the received block into sub-blocks and send the sub-blocks to different switches for transmission during a particular timeslot on an egress switch link.

In summary, a switching chassis 1220 may replace a switching plane 220 in FIG. 2. A FM that would have sent data to a particular switching plane 220 would now send data to a particular switching chassis 1220. Switching chassis 1220 may permit additional line modules 1210 to be included in node 120 and, thus, increases the amount of bandwidth that node 120 is capable of handling. While one set of switching chassis 1220 is shown in FIG. 12, there may be one or more additional stages of switching chassis 1220 in other implementations. Each additional stage of switching chassis 1220 may perform operations similar to that described above.

CONCLUSION

Implementations described herein may provide TDM functions within a network device. These implementations may permit an operator to program switching components within the network device so that the switching components can perform fully non-blocking transfer of data. As a result, the incoming data need not include destination information because the switching components are programmed with the information necessary to transfer the data. With such an arrangement, as described herein, additional channels may be added without affecting any existing channels (e.g., no reassigning of existing channels is necessary).

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 8, the order of the blocks may be modified in other implementations. Further, non-dependent blocks may be performed in parallel.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to any form of circuit-switching network.

In addition, an implementation has been described where each of switches 610 includes a configuration store 615 that stores mapping information. In another implementation, configuration stores 615 may be replaced by a centralized memory that stores the mapping information for all, or a subset, of switches 610. In this situation, node 120 may include communication paths via which switches 610 can obtain the mapping information from the centralized memory.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device, comprising:
   a plurality of ingress modules, one of the plurality of ingress modules being configured to:
      receive an incoming stream of data over a plurality of timeslots;
   a plurality of egress modules; and
   a plurality of switches,
      each of the plurality of switches including a plurality of ingress links and a plurality of egress links, one of the plurality of ingress links connecting to the one of the plurality of ingress modules, and one of the plurality of egress links connecting to one of the plurality of egress modules, the first one of the plurality of timeslots being associated with the one of the plurality of ingress links, said one of the plurality of ingress modules outputting a portion of the data associated with a first one of the plurality of time slots, the portion of the data being supplied to said each of the plurality of switches;
      each of the plurality of switches including a corresponding one of a plurality of memories, each of the plurality of memories storing identical mapping information that maps the first one of the plurality of timeslots to a second one of the plurality of timeslots, the second one of the plurality of timeslots being associated with the one of the plurality of egress links,
      one of the plurality of switches being configured to:
         identify, based on the mapping information, the second one of the plurality of timeslots, and
         output the portion of the data on the one of the plurality of egress links to the one of the plurality of egress modules;
   where the one of the plurality of egress modules is configured to:
      receive the portion of the data, and
      output the portion of the data, during the second one of the plurality of timeslots, as a portion of an outgoing data stream.

2. The network device of claim 1, where, when outputting a portion of the data associated with the first one of the plurality of timeslots, the one of the plurality of ingress modules is configured to:
   divide the portion of data into blocks of data, and
   output each of the blocks of data to a different one of the plurality of switches.

3. The network device of claim 2, where, when outputting each of the blocks of data, the one of the plurality of ingress modules is configured to sequentially output each of the blocks of data to each of the plurality of switches.

4. The network device of claim 2, where, when receiving the portion of data, the one of the plurality of egress modules is configured to:
   receive the blocks of data from the different ones of the plurality of the switches, and
   reassemble the received blocks of data for transmission during the second one of the plurality of timeslots.

5. The network device of claim 1, where the mapping information is programmed into each of the plurality of switches, on a per-network device basis, by an operator.

6. The network device of claim 1, storing information for carrying out a network-level routing and signaling algorithm, where the mapping information is programmed into each of the plurality of switches under control of a network-level routing and signaling algorithm.

7. The network device of claim 1, where the mapping information maps the first one of the plurality of timeslots to the second one of the plurality of timeslots and a third one of the plurality of timeslots, the third one of the plurality of timeslots being associated with another one of the plurality of egress links.

8. The network device of claim 1, further including first and second physical units that are separate from one another, where at least one of the plurality of ingress modules is housed in the first physical unit and the second physical unit houses one of the plurality of switches.

9. The network device of claim 8, further comprising:
a converter to convert the portion of data, outputted from the one of the plurality of ingress modules in the first physical unit, into an optical signal for transmission to the one of the plurality of switches in the second physical unit.

10. A method performed by a network device, comprising:
storing identical mapping information associated with each of a plurality of switches in each of a plurality of memories, each of the plurality of memories being associated with a corresponding one of the plurality of switches, each of the plurality of switches including a plurality of ingress links and a plurality of egress links, the mapping information mapping a first timeslot, associated with one of the plurality of ingress links, to a second timeslot, associated with one of the plurality of egress links;
receiving on the one of the plurality of ingress links data during the first time slot;
supplying the data to each of the plurality of switches;
identifying the second timeslot and the one of the plurality of egress links, associated with the first timeslot and the one of the plurality of ingress links, based on the mapping information; and
outputting, by each of the plurality of switches, the data, during the second timeslot, on the one of the plurality of egress links.

11. The method of claim 10, further comprising:
receiving a stream of data over a plurality of timeslots;
dividing a portion of the data, associated with the first timeslot, into blocks of data; and
outputting each of the blocks of data to a different one of the plurality of switches.

12. The method of claim 11, further comprising:
receiving the blocks of data from the different ones of the plurality of the switches; and
assembling the received blocks of data for transmission during the second timeslot.

13. The method of claim 10, further comprising:
receiving the mapping information via input from an operator.

14. The method of claim 10, where the mapping information maps the first timeslot associated with the one of the plurality of ingress links to the second timeslot and a third timeslot, the third timeslot being associated with another one of the plurality of egress links.

15. A device, comprising:
a plurality of switches,
each of the plurality of switches including a plurality of ingress links, a plurality of egress links, and a plurality of memories,
one of the plurality of switches storing mapping information in one of the plurality of memories that identifies a first timeslot with one of the plurality of egress links for data received, wherein the data received is received during a second timeslot, on one of the plurality of ingress links,
the one of the plurality of switches being configured to:
receive data, associated with the second timeslot, on the one of the plurality of ingress links,
identify the first timeslot and the one of the plurality of egress links, associated with the second timeslot and the one of the plurality of ingress links, based on the mapping information, and
output the data, during the first timeslot, on the one of the plurality of egress links; and
an ingress module to:
receive a stream of data over a plurality of timeslots,
divide a portion of the data, associated with the second timeslot, into blocks of data, and
output one of the blocks of data to each of the plurality of switches,
wherein each of the plurality of memories stores the mapping information, such that the mapping information is identical in each of the plurality of memories.

16. The device of claim 15, further comprising:
an egress module to:
receive the blocks of data from the plurality of switches, and
assemble the received blocks of data for transmission during the first timeslot.

17. The device of claim 15, where the mapping information is received via input from an operator on a per-device basis.

18. The device of claim 15, where the mapping information is programmed into each of the plurality of switches under control of a network-level routing and signaling algorithm.

19. The device of claim 15, where the mapping information maps the second timeslot associated with the one of the plurality of ingress links to the first timeslot and a third timeslot, the third timeslot being associated with another one of the plurality of egress links.

20. The device of claim 15, where a first one of the plurality of switches is housed in a first physical unit and a second one of the plurality of switches is housed in a second physical unit, where the first physical unit is different from the second physical unit.

21. A system, comprising:
a set of ingress modules;
a set of switches, a first one of the ingress modules being configured to receive a first stream segmented into a plurality of first timeslots, supply a first portion of data, associated with one of the plurality of first timeslots to each of the switches, and supply a second portion of data, associated with the one of the plurality of first timeslots, to each of the switches;
a set of egress modules, one of the egress modules being coupled to the first and second ones of the switches; and
a plurality of memories, each of which storing identical mapping information associated with the switches,
where, based on the mapping information, a first one of the switches supplies the first portion of the data to the one of the plurality of egress modules during one of a plurality of second timeslots, and a second one of the switches supplies the second portion of the data to the one of the plurality of egress modules during the one of the plurality of second timeslots, the one of the plurality of egress modules having an output that supplies the first and second portions of data during the one of the plurality of second timeslots.

22. The switch of claim 21, where the mapping information maps the one of the plurality of first timeslots to multiple ones of the plurality of second timeslots.

23. A switching system, comprising:
a first physical unit housing:
   an ingress module to:
      receive an incoming stream of data over a plurality of timeslots,
      divide a portion of data, associated with a first one of the plurality of timeslots, into a plurality of blocks of data, and
      output the plurality of blocks of data;
a second physical unit housing an egress module;
a plurality of third physical units connected to the first physical unit and the second physical unit, one of the third physical units housing:
   a plurality of switch managers, one of the plurality of switch managers being configured to:
      receive an incoming stream of blocks of data over a plurality of timeslots,
      divide one of the blocks of data, associated with the first one of the plurality of timeslots, into a plurality of sub-blocks of data, and
   a plurality of switches, said one of the plurality of switch managers being configured to supply one of the plurality of sub-blocks of data to each of the plurality of switches, one of the plurality of switches being configured to:
      identify, based on mapping information accessible by the one of the plurality of switches, a second one of the plurality of timeslots, and
      output said one of the plurality of sub-blocks of data for transmission by the egress module during the second one of the plurality of timeslots,
   wherein each of the plurality of switches includes a corresponding one of a plurality of memories, each of the plurality of memories storing the mapping information, such that the mapping information is identical in each of the plurality of memories.

24. A switching system, comprising:
an ingress module to:
   receive an incoming stream of data over a plurality of timeslots,
   divide a portion of data, associated with a first one of the plurality of timeslots, into a plurality of blocks of data, and
   output the plurality of blocks of data;
an egress module;
a plurality of switch managers, one of the plurality of switch managers being configured to:
   receive an incoming stream of blocks of data over a plurality of timeslots,
   divide one of the blocks of data, associated with the first one of the plurality of timeslots, into a plurality of sub-blocks of data; and
a plurality of switches, said one of the plurality of switch managers being configured to supply one of the plurality of sub-blocks of data to each of the plurality of switches, one of the plurality of switches being configured to:
   identify, based on mapping information accessible by the one of the plurality of switches, a second one of the plurality of timeslots, and
   output the one of the plurality of sub-blocks of data for transmission by the egress module during the second one of the plurality of timeslots,
wherein each of the plurality of switches includes a corresponding one of a plurality of memories, each of the plurality of memories storing the mapping information, such that the mapping information is identical in each of the plurality of memories.

* * * * *